United States Patent
Lu

(10) Patent No.: US 7,374,797 B2
(45) Date of Patent: May 20, 2008

(54) CONTINUOUS COMBINED PIGMENTED WAX COMPOUNDING AND BICHROMAL SPHERE FABRICATION PROCESS

(75) Inventor: Y. Martin Lu, Mundelien, IL (US)

(73) Assignee: Xerox Corporation, Norwalk, CT (US)

( * ) Notice: Subject to any disclaimer, the term of this patent is extended or adjusted under 35 U.S.C. 154(b) by 967 days.

(21) Appl. No.: 10/397,017

(22) Filed: Mar. 25, 2003

(65) Prior Publication Data

US 2003/0180494 A1    Sep. 25, 2003

Related U.S. Application Data

(60) Provisional application No. 60/367,242, filed on Mar. 25, 2002.

(51) Int. Cl.
  *B05D 3/02* (2006.01)
(52) U.S. Cl. ............ 427/384; 428/402; 428/403; 264/5; 264/8; 264/12; 264/13; 425/6; 425/8; 425/174.4; 425/174.8 E
(58) Field of Classification Search ............ 427/384; 428/402, 403; 264/5, 8, 12, 13; 425/6, 8, 425/174.4, 174.8 E
See application file for complete search history.

(56) References Cited

U.S. PATENT DOCUMENTS

| | | | |
|---|---|---|---|
| 4,126,854 A | 11/1978 | Sheridon | |
| 4,143,103 A | 3/1979 | Sheridon | |
| 4,438,160 A | 3/1984 | Ishikawa et al. | |
| 4,810,431 A | 3/1989 | Leidner | |
| 5,262,098 A | 11/1993 | Crowley et al. | |
| 5,389,945 A | 2/1995 | Sheridon | |
| 5,767,826 A | 6/1998 | Sheridon et al. | |
| 5,891,479 A | 4/1999 | Sheridon | |
| 5,900,192 A | 5/1999 | Richley | |
| 5,919,409 A | 7/1999 | Sheridon | |
| 5,976,428 A | 11/1999 | Richley | |
| 5,989,629 A | 11/1999 | Sacripante et al. | |
| 6,097,531 A | 8/2000 | Sheridon | |
| 6,174,153 B1 | 1/2001 | Sheridon | |
| RE37,085 E | 3/2001 | Sheridon | |
| 6,235,395 B1 | 5/2001 | Sacripante et al. | |
| 6,241,921 B1 | 6/2001 | Jacobson et al. | |
| 6,312,971 B1 | 11/2001 | Amundson et al. | |
| 6,329,967 B1 | 12/2001 | Little et al. | |
| 6,406,747 B1 | 6/2002 | Biegelsen et al. | |
| 6,419,982 B2 | 7/2002 | Sacripante et al. | |
| 6,440,252 B1 | 8/2002 | Biegelsen et al. | |
| 6,445,490 B1 | 9/2002 | Chopra et al. | |
| 6,485,280 B1 | 11/2002 | Richley | |
| 2002/0084539 A1 | 7/2002 | Sheridon et al. | |

FOREIGN PATENT DOCUMENTS

| EP | 540281 A | 5/1993 |
| EP | 929060 A | 7/1999 |
| EP | 0929060 A2 * | 7/1999 |
| EP | 1070544 A | 1/2001 |
| EP | 1070544 A2 * | 1/2001 |

* cited by examiner

*Primary Examiner*—Leszek B Kiliman
(74) *Attorney, Agent, or Firm*—Pillsbury Winthrop Shaw Pittmam LLP

(57) ABSTRACT

A system and method for the continuous fabrication of bichromal spheres by introducing continuous streams of differently colored, pigmented polymer melts to substantially opposite sides of a plurality of spinning disks. The system comprises a first and second extruder which melts a raw polymer material and mixes the melted polymer with a pigment and optionally a charge control agent. The first and second extruders are connected to substantially opposite sides of a plurality of spinning disks with optionally interconnected gear pumps and mixing devices. The instant system and method is useful in fabricating large quantities of bichromal spheres in a continuous manner with a higher degree of uniformity in their physical characteristics.

30 Claims, 2 Drawing Sheets

CONTINUOUS COMBINED PIGMENTED WAX COMPOUNDING AND BICHROMAL SPHERE FABRICATION PROCESS

CROSS REFERENCES

This application claims priority to U.S. Provisional Application Ser. No. 60/367,242, filed Mar. 25, 2002, the contents of which are incorporated herein by reference in its entirety.

BACKGROUND OF THE INVENTION

Rotating element display material has been disclosed in U.S. Pat. Nos. 4,126,854, 4,143,103 and 5,389,945, each herein incorporated by reference. The rotating element display material generally comprises a substrate, a dielectric fluid and a set of rotatable elements. The rotating element display material has found use as reusable "electric paper" since it has many of the attributes of paper documents when the display is in sheet form. The rotating elements are embedded in an elastomer material which is then cured and swelled to create cavities around the elements. The rotating element display material has many of the qualities of real paper, including being flexible and affordable, it can be written on like paper, it can be copied like paper, it can be easily viewed in high levels of ambient light, and it will retain images nearly as long as regular paper.

The rotating elements, also referred to as bichromal spheres or bichromal balls, are optically and electronically anisotropic. For example, a rotating element has two distinct hemispheres, one black and one white, with each hemisphere having a distinct electrical characteristic giving it a dipole moment with respect to a dielectric fluid. An image is formed on the electric paper by applying an external electric field which rotates the bichromal sphere differentiated by the contrasting charges of the two hemispheres of the rotating element. The difference in charges between the hemispheres of the ball causes the ball to act like a dipole in the presence of an electrical field, which in turn causes the ball to rotate until its dipole vector lines up in the direction of the externally applied electric field.

Varying methods have been developed for the fabrication of the rotating elements; however, these existing methods are not adaptable to either a continuous fabrication of the rotating elements or a large-scale fabrication process which is commercially acceptable. For example, U.S. Pat. No. 4,438,160 describes the fabrication of rotating elements using a vapor deposition method. Generally, the vapor deposition method entails fabrication of rotating elements of a single color. A contrasting pigment is then evaporated on to one side of the rotational element resulting in a bichromal sphere.

Alternately, fabrication of rotating elements, as described in U.S. Pat. No. 4,810,431 to Leidner, may be achieved by (a) co-extruding a fiber of a semi-circular layer of a polyethylene pigmented white and a semi-circular black layer of polyethylene containing magnetite; (b) chopping the resulting fiber into fine particles ranging from 10 microns to about 10 millimeters; (c) mixing the particles with clay or anti-agglomeration materials, and (d) heating the mixture with a liquid at about 120° C. to spheradize the particles, followed by cooling to allow of solidification.

U.S. Pat. No. 5,262,098 describes an apparatus useful for fabricating bichromal spheres which comprises a separator member, also called a spinning disk, having opposing first and second surfaces, an outer edge region in contact with both surfaces, and means for delivering a first and second pigmented polymer melt over the first and second surfaces, respectively. The respective liquid materials arrive at the edge at substantially the same flow rate and form a reservoir outboard of the edge region. The reservoir comprises side by side regions of different colors which do not intermix. The separator member is rotated and the centrifugal forces cause the first and second liquid materials to pull away from the separator member and out of the reservoir as a plurality of side-by-side bichromal streams. As a result of the centrifugal forces, the forward ends of the bichromal steams become unstable, break into droplets which form into spherical balls each comprising hemispheres of differently pigmented polymer melts.

The existing systems for fabricating bichromal spheres employ a batch process for the preparation of the pigmented polymer melt. Basically, polymer material forming the matrix of the sphere, such as polyethylene wax, is poured into mixing tanks and heated. A separate tank is used for making the white pigmented polymer and for making the black pigmented polymer. A white pigment, usually titanium dioxide, is added to the first tank of molten material, mixed for approximately two hours then moved to solidify. Similarly, a black pigment, such as ferrous oxide, and optionally a charge control agent is added to the second tank of molten material which is also mixed for approximately two hours and allowed to solidify. Next, the white pigmented polymer material and the black pigmented polymer material are placed into separate melters where a white pigmented melt and black pigmented melt are formed. The separate melts are then introduced to the spinning disk as described above.

The inefficiencies of the existing methods for fabricating the rotational elements make these methods ineffective for continuous or large-scale production processes. For example, the existing fabrication methods which utilize spinning disks require 3 to 4 hours, or more, depending on batch size, to prepare and produce a single batch of rotating elements. However, actual production of useable rotating elements occurs for as little as 20 minutes, with the remainder being spent on preparation of the material and stabilization of the system. In addition, during the stabilization of the system, the production of irregular and unusable rotational elements results in waste of raw materials. Finally, rotational elements produced by different batches may have inconsistencies in critical features of the sphere such as contrast ratio of the display sheet into which the spheres are incorporated, diameter, complimentarity, and sphere quality, where sphere quality is understood to be a measure of the roundness of the spheres.

Accordingly, it is an object of the present invention to provide for a continuous fabrication of anisotropic rotational elements, such as hemispherically bichromal spheres, wherein a high level of consistency and complimentarity of the rotational element is obtained.

SUMMARY

The present invention provides for the continuous fabrication of anisotropic rotational elements, such as hemispherically bichromal spheres. A continuous flow of colored, hardenable liquid material is produced by an extruder which receives and melts the base polymer and mixes the molten polymer with a first pigment. A second continuous flow of differently colored hardenable liquid material is produced by a second extruder which receives and melts the base polymer and mixes the molten polymer with a second pigment. The invention further provides for pumping both flows of the colored hardenable liquid material to opposing surfaces of a spinning disk at a substantially uniform consistency, temperature and flow rate. The centrifugel forces of the spinning disk causes both flows of the colored hardenable liquid materials to form a reservoir outboard of the spinning disk from which bichromal streams of the hardenable liquid material extrude. The ends of the bichromal streams become unstable, break off, and harden to form bichromal spheres.

The system described herein is highly stable resulting in a higher degree of uniformity of the colored hardenable liquid material being fed to the spinning disks. As a result, the spinning disks rotate at speeds in excess of 3000 rpm, providing for a higher yield and lower diameter rotating element than prior art systems. In addition, the system is scalable to allow for low-volume production utilizing a single or small number of spinning disks, or high-volume production where multiple spinning disks are fed by high volume extruders.

DETAILED DESCRIPTION OF THE DRAWINGS

Figure 1:
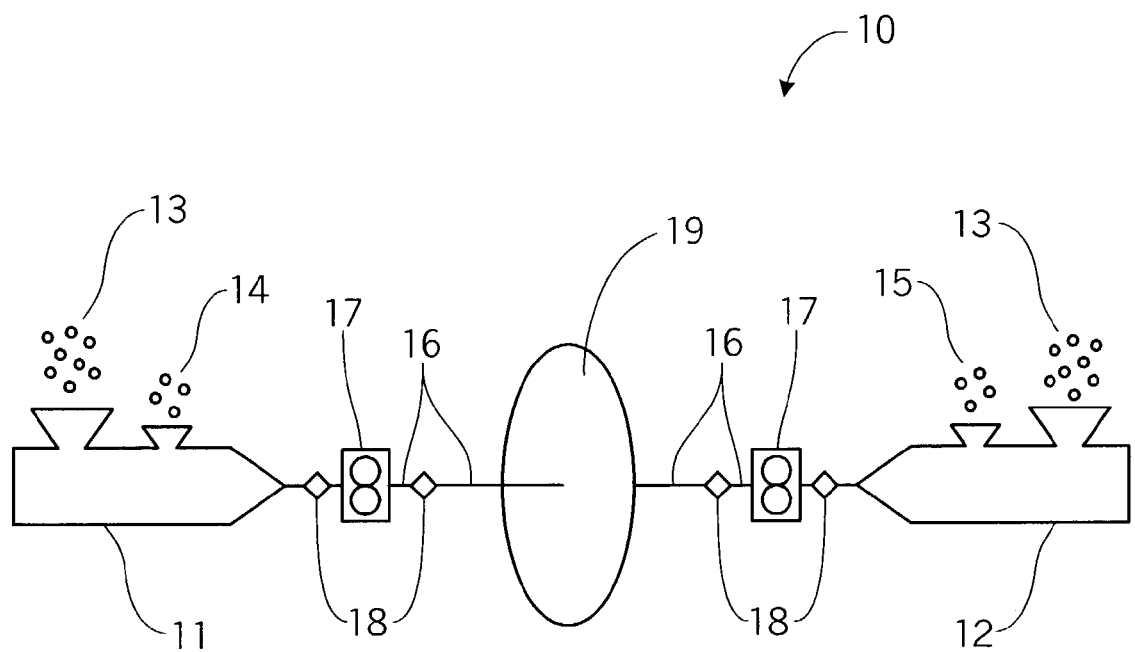
FIG. 1 is a diagram of the continuous fabrication system of the present invention in a one spinning disk embodiment.

The present invention provides a system and method for continuously fabricating anisotropic rotational elements, which is both scalable and produces rotating elements which are highly uniform. As shown in FIG. 1, the system 10 has two extruders 11 and 12. An unmelted polymer material 13, such as polyethylene wax, is introduced into both extruders 11 and 12. In addition, a white pigment 14, such as titanium dioxide, is added to extruder 11 and a black pigment 15, such as ferrous oxide, is added to extruder 12. Optionally, before introducing the pigments to the extruders the pigments may be pre-mixed with a charge control agent which is effective in importing a charge to each of the hemispheres. The extruder melts the polymer material, mixes the polymer material with the pigment and optionally the charge control agent and meters the resultant pigmented polymer melt into tubing 16, which allows for the even and continuous flow of a low viscosity liquid. The tubing 16 is heated and insulated to maintain the temperature of the pigmented polymer melt within ±2° C. of the desired temperature.

The pigmented polymer melt traverses the tubing 16 and is received by gear pump 17. The gear pumps 17 are coordinated to obtain uniform flow rates of the pigmented polymer melt through the tubing 16 between the gear pumps 17 and the spinning disks 19. Optionally, sensors 18 may be placed at intervals along the tubing 16 to monitor the flow rate and other characteristics of the system. For example, the pressure of the pigmented polymer melt traversing tubing 16 between the extruder 11 and 12 and gear pump 17 is preferably monitored to maintain pressure within ±15 psi of the desired pressure, and a temperature within ±1° C. The pigmented polymer melt is pumped from gear pumps 17 into tubing 16 and is delivered to the spinning disk 19.

The spinning disks 19 have a first and second surface and an edge connected to both the first and second surfaces. The spinning disks 19 receive the first pigmented polymer melt, which originated at extruder 11, on the first surface of the spinning disk and the second pigmented polymer melt, which originated at extruder 12, on the second surface. Centrifugal forces cause the first and second pigmented polymer melts to move to the edge of the spinning disks 19, form a reservoir outboard of the edge, and form extruding streams of bichromal pigmented polymer melts comprised of the first and the second pigmented polymer melts. The bichromal streams become unstable, break into droplets, and harden into bichromal spheres.

Figure 2:
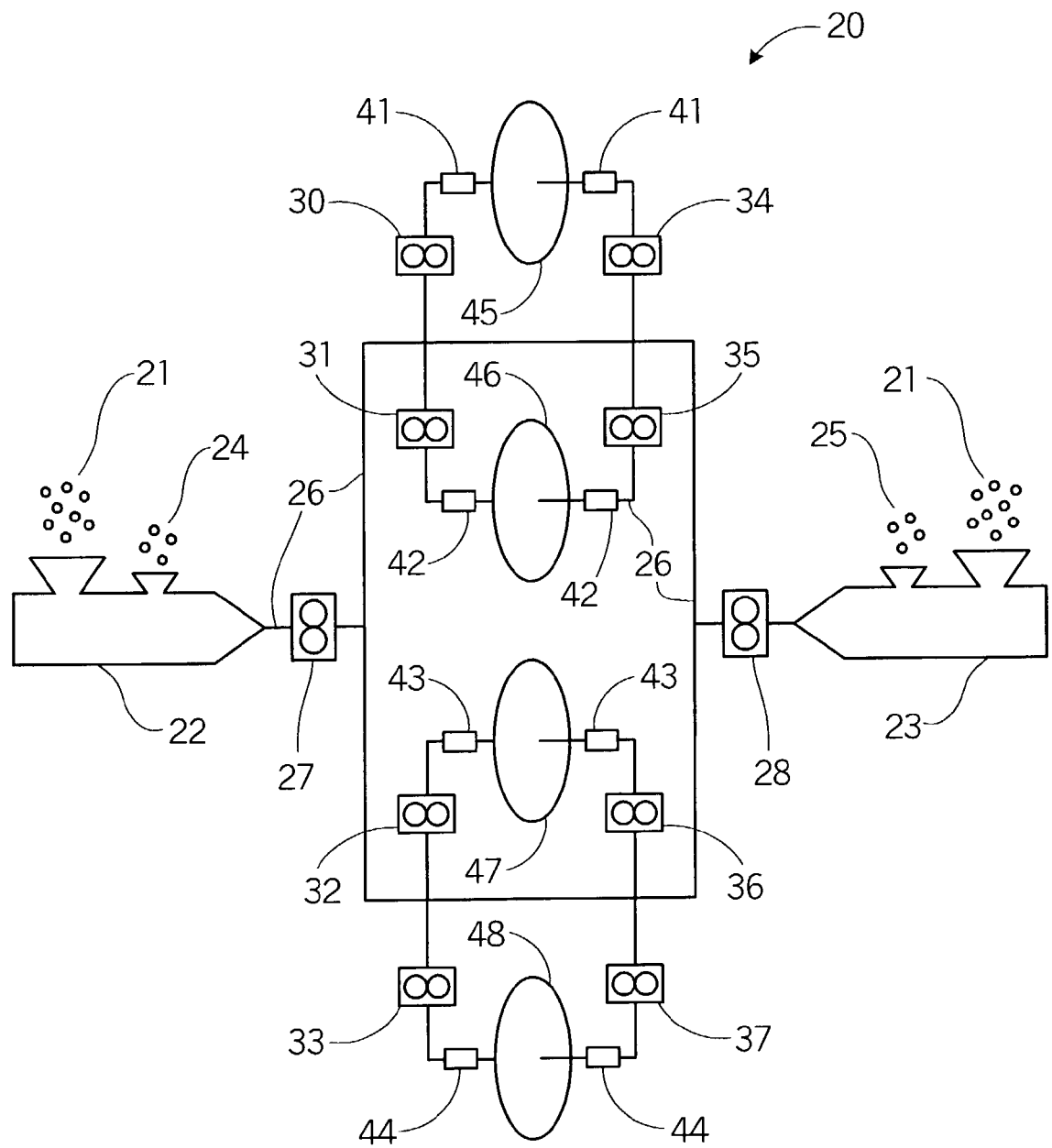
FIG. 2 is a diagram of the continuous fabrication system utilizing optional mixing devices in a four spinning disk embodiment.

FIG. 2 illustrates a preferred embodiment of the system 20 for the continuous fabrication of rotational elements. As shown in FIG. 2, an unmelted polymer 21 is continuously entered into two extruders 22 and 23. Pigments 24 and 25 are added to the extruders 22 and 23, respectively, preferably through side feeders. The pigments may optionally be pre-mixed with a charge control agent before introduction to the extruder.

The extruders 22 and 23 melt the polymer materials, mixes the melted polymer 21, the pigments 24 and 25, respectively, and meters pigmented polymer melt from the extruder. Upon being pumped from the extruder, the pigmented polymer melt traverses tubing 26 and is received by gear pumps 27 and 28 which are coordinated to the other gear pumps in the system 20 to obtain a uniform flow rate of the liquefied pigmented material. Further, the flow rate at which the gear pumps 27 and 28 are set will vary depending on the number of spinning disks employed in the system. Typically, the gear pumps will be set at a rate of between 2 kg/hr and 8 kg/hr for each spinning disk in the system. In a system employing four (4) spinning disks, such as system 20 shown in FIG. 2, the flow rate to gear pumps 27 and 28 are optimally set between 8 kg/hr and 32 kg/hr. The gear pumps 27 and 28 may be connected to the additional gear pumps 30, 31, 32, 33 and 34, 35, 36, 37 to provide for more precise control of the flow of the pigmented polymer melt. In this embodiment, the flow rate of gear pump 27 and gear pumps 30, 31, 32, 33 are coordinated to maintain a desired pressure at which the pigmented polymer melt flows through tubing 26. Similarly, the flow rate of gear pump 28 and gear pumps 34, 35, 36, 37 are coordinated to maintain a desired pressure at which the pigmented polymer melt flows through tubing 26. Optionally, the system 20 may include sensors, not shown, which monitor the characteristics of the pigmented polymer melt such as temperature, viscosity, flow rate and other characterizations of the pigmented polymer melt in the tubing 26.

As further shown in FIG. 2, the system 20 may optionally include mixing devices 41, 42, 43 and 44. The mixing devices, which may be a static mixer, re-mixes the pigmented polymer melt prior to its delivery to the spinning disk. The mixing devices 41, 42, 43 and 44 are utilized to obtain a more uniform consistency of the distribution of pigment throughout the polymer melt and a more uniform temperature prior to delivering the pigmented polymer melt to the spinning disks. Upon exiting the mixing devices 41, 42, 43 and 44 the pigmented polymer melt is delivered to spinning disks 45, 46, 47 and 48.

The spinning disks 45, 46, 47 and 48 each have a first surface and second surface, and an edge connected to both the first and second surfaces. The spinning disks 45, 46, 47 and 48 receive the first pigmented polymer melt, which originated at extruder 22, on the first surface of the spinning disk and the second pigmented polymer melt, which originated at extruder 23, on the second surface. Centrifugal forces cause the first and second pigmented polymer melts to move to the edge of the spinning disks 45, 46, 47 and 48, form a reservoir outboard of the edge, and form extruding streams of bichromal pigmented polymers comprised of the first and second pigmented polymer melts. The bichromal streams become unstable, break into droplets, and harden into bichromal spheres.

Because the present system delivers a continuous supply of highly uniform pigmented polymer melt to the spinning disks, the spinning disks utilized in the herein described system, function in optimized conditions over the prior art. Because the present invention provides for a continuous flow of colored wax at a substantially uniform consistency and temperature, it is possible to rotate the spinning disks at higher speeds than existing systems. The spinning disks used in the instant system operate between 1000 rpm and 8000 rpm, with a preferred range of 3000 rpm to 5000 rpm. Using higher rotational speeds for the spinning disks, the system of the present invention provides for both a higher yield and lower diameter rotating element.

Preferred extruders for use in the herein described system are self-whipping, twin screw co-rotating extruders, although other types of extruders can be used. The extruders operate at temperatures between 30° C. and 300° C., with the preferred range of 70° C. and 180° C. The extruders operate at a rotational speed of between 100 rpm and 800 rpm with the preferred range being 150 rpm to 800 rpm. The combined compounding and spinning process also eliminates the need to remelt the pigmented polymers which can cause pigment separation from the polymers and may also cause degradation of the polymer itself.

The herein described system may optionally include a computer-controlled monitoring system which, among other things, monitors the flow rate and other characteristics of the pigmented polymer melt to balance its flow rate and temperature. The monitoring system comprises a computer and a series of sensors connected to the tubing which sensors can monitor the pigmented polymer melt within the tubing. In addition, the computer may be capable of communicating with the various components of the system, receive data on the operation of the component, and issue commands to the component to modify the performance of the component.

The quality of a rotational element is measured mainly by three factors: its contrast ratio when made into a display, the diameter of the sphere and its complimentarity. The complimentarity of a bichromal sphere refers to precision of the sphere's bichromality. A sphere will have a higher complimentarily the closer it is to having perfect hemispheres of white and black pigmented polymer. The herein described invention results in not only an improved complimentarity, contrast ratio of the display made, and smaller diameter bichromal spheres, but more consistency between individual spheres. For example, the system can consistently produce bichromal spheres with diameter of between 75 microns and 106 microns. In addition, spheres of much smaller diameter can be consistently produced. Furthermore, the standard deviation in complimentarily of spheres made with the present invention is about 3% compared to a standard deviation of about 5% for spheres made using prior art processes. As used in this application, "about" shall mean plus or minus 10%. For example, the standard deviation in complimentarily of spheres made with the present invention has been measured at 2.91%, compared to a standard deviation of 5.73% when spheres are made using prior art processes. In contrast to existing batch processing systems which result in spheres with varying contrast ratios, diameters and complimentarity between individual batches, rotational elements fabricated using the herein described system and method will consistently fall within desired parameters.

As an example of the operation of the continuous fabrication system, a polyethylene wax of 1000 molecular weight was fed into one of the extruders and mixed with titanium dioxide to make a liquefied white pigmented wax. Similarly, a polyethylene wax of 1000 molecular weight was fed into the second extruder and mixed with a ferrous oxide black pigment with a charge control agent to make a liquefied black pigmented wax. The extruder temperature zones were set between 77° C. and 118° C. and the extruder ran at a speed at 200 rpm. The compounded waxes were fed to each side of the spinning disk with gear pumps controlled at 118° C. The spinning disks operated at a speed of 4100 rpm.

While the instant invention has been described in conjunction with the exemplary embodiments outlined above, it is evident that many alternatives, modifications and variations will be apparent to one of ordinary skill in the art. Accordingly, the exemplary embodiments of this invention as set forth above are intended to be a illustrative, not limiting. Various modifications or changes may be made without departing from the spirit and scope of the invention or may occur to one skilled in the art subsequent to review of the present application. Such modifications or changes that are intended to be included with the scope of the present invention.

I claim:

1. A method for continuously fabricating bichromal spheres comprising:
    supplying a solid polymer and a first pigment to a first extruder, said polymer being melted in the first extruder and mixed with the first pigment resulting in a first pigmented polymer melt;
    supplying a second solid polymer and a second pigment to a second extruder, said second polymer being melted in the second extruder and mixed with the second pigment resulting in a second pigmented polymer melt;
    pumping said first and second pigmented polymer melt from said first and second extruder to a plurality of spinning disks at substantially opposite sides;
    rotating said plurality of spinning disks causing said first and second pigmented polymer melt to flow to an outer edge region of the spinning disks and form outbound of said outer edge a plurality of bichromal streams, thereby forming spherical balls comprising hemispheres of differently colored pigmented polymer melt from said bichromal streams;
    remixing said first pigmented polymer melt immediately prior to introducing said first pigmented polymer melt to said plurality of spinning disks; and
    remixing said second pigmented polymer melt immediately prior to introducing said second pigmented polymer melt to said plurality of spinning disks.

2. The method of claim 1 wherein said remixing step occurs after the first pigmented polymer melt has exited the first extruder.

3. The method of claim 1 wherein said remixing step occurs after the second pigmented polymer melt has exited the second extruder.

4. The method of claim 1 wherein said first and second polymer material is selected from the group consisting of polyethylene, polypropylene, polystyrene, and polyester.

5. The method of claim 1 wherein said first pigment is titanium dioxide.

6. The method of claim 5 wherein a charge control agent is supplied to the first extruder with the first pigment.

7. The method of claim 1 wherein said second pigment is a ferrous oxide black pigment.

8. The method of claim 7 wherein a charge control agent is supplied to the second extruder with the second pigment.

9. The method of claim 1 wherein the pumping of said first and second pigmented polymer melt occurs at substantially equivalent flow rates.

10. The method of claim 1 wherein the ratio of the rate of pumping the first pigmented polymer melt and the rate of pumping the second pigmented polymer melt is within the range of about 0.8 to about 1.2.

11. The method of claim 1 wherein said spherical balls are formed in a continuous manner.

12. A system for continuously fabricating bichromal spheres, comprising:
 a first extruder connected to a first set of a plurality of gear pumps, where the first extruder receives and melts a solid polymer material and mixes the melted polymer with a first pigment resulting in a first pigmented polymer melt;
 a second extruder connected to a second set of a plurality of gear pumps, where the second extruder receives and melts the solid polymer material and mixes the melted polymer with a second pigment resulting in a second pigmented polymer melt;
 a plurality of spinning disks connected to the first and second extruder by tubing each spinning disk having a first surface, a second surface located opposite said first surface and a edge region in contact with both said first and second surfaces wherein said first surface receives a continuous flow of the first pigmented polymer melt from tubing connected to the first set of gear pumps and the second surface receives a continuous flow of the second pigmented polymer melt from tubing connected to the second set of gear pumps;
 a first set of mixing devices connected to the first set of gear pumps by tubing, where the first set of mixing devices is located to deliver liquid material directly to the first surface of the spinning disks; and
 a second set of mixing devices connected to the second set of gear pumps by tubing, where the second set of mixing devices is located to deliver liquid material directly to the second surface of the spinning disks.

13. The system as defined in claim 12 wherein the first and second set of mixing devices are static mixing devices.

14. The system as defined in claim 12 wherein said first extruder and said second extruder are twin screw extruders.

15. The system as defined in claim 14 wherein said twin screw extruders are co-rotating extruders.

16. The system as defined in claim 12 wherein said first extruder and said second extruder operate at temperatures ranging between about 70°C. and about 300°C.

17. The system as defined in claim 12 wherein said first extruder and said second extruder operate at temperatures ranging between about 80°C and about 140°C.

18. The system as defined in claim 12 wherein said first extruder and said second extruder operate at rotational speeds between about 100 rpm and about 800 rpm.

19. The system as defined in claim 12 wherein the flow rate of the first and second sets of gear pumps is between about 2 kg/hr and about 8 kg/hr.

20. The system as defined in claim 12 wherein the flow rate of the first and second sets of gear pumps is periodically adjusted to maintain a substantially constant pressure of the first and second pigmented polymer melts, respectfully, in the tubing.

21. The system of claim 12 wherein the spinning disk has a rotational speed of between about 3000 rpm and about 5000 rpm.

22. The system of claim 12 where the spinning disk has a rotational speed of at least about 3000 rpm.

23. The system of claim 12 wherein the length of the tubing between the first set of gear pumps and the first surface of the spinning disk is substantially equivalent to the length of the tubing between the second set of gear pumps and the second surface of spinning disk.

24. The system of claim 12 further comprising:
 a plurality of sensors located on the tubing where the sensors are placed to monitor the first and second pigmented polymer materials flowing through the tubing;
 a computer in communication with the sensors, where the computer receives data from the sensors; and
 a software program residing on the computer which monitors the data received from the sensors and modifies the performance of the system in response to said data.

25. The system of claim 24 wherein the sensors monitor the temperature of the first and second pigmented polymer materials in the tubing.

26. The system of claim 24 wherein the sensors monitor the pressure of the first and second pigmented polymer materials in the tubing.

27. The system of claim 24 further comprising an interface to deliver commands from the software program to the first and second set of gear pumps.

28. The system of claim 24 further comprising an interface to deliver commands from the software program to the first and second extruder.

29. The system of claim 24 further comprising sensors which monitor the amount of solid material being supplied to the first and second extruders.

30. The system of claim 12 further comprising means for continuously supplying the solid polymer material to the first and second extruders.

* * * * *